United States Patent [19]

Strippler et al.

[11] Patent Number: 4,990,346

[45] Date of Patent: Feb. 5, 1991

[54] METHOD FOR OPERATING THE RAKE GEAR IN A LAUTER TUB FOR BEER PRODUCTION

[75] Inventors: Kurt Strippler, Marzling; Klaus Wasmuht, Ellingen; Wolfgang Maitner, Freising, all of Fed. Rep. of Germany

[73] Assignee: Anton Steinecker Maschinenfabrik GmbH, Fed. Rep. of Germany

[21] Appl. No.: 418,345

[22] Filed: Oct. 6, 1989

[30] Foreign Application Priority Data

Oct. 7, 1988 [DE] Fed. Rep. of Germany ...... 3834207
Dec. 30, 1988 [DE] Fed. Rep. of Germany ...... 3844389

[51] Int. Cl.$^5$ .............................................. C12C 7/00
[52] U.S. Cl. ..................................... 426/231; 426/29; 426/495
[58] Field of Search ................... 426/11, 29, 231, 489, 426/495, 519; 99/277.2

[56] References Cited

U.S. PATENT DOCUMENTS 4,542,682  9/1985  Hancock .............................. 426/29

FOREIGN PATENT DOCUMENTS 139480  1/1980  Fed. Rep. of Germany .

OTHER PUBLICATIONS

Brauwelt, p. 2341; Fig. 4, published in Dec., 1988.

Primary Examiner—George Yeung
Attorney, Agent, or Firm—Laubscher, Presta and Laubscher

[57] ABSTRACT

The height position of the rake gear rotating in a lauter tub for the production of beer is automatically controlled in accordance with the flow rate or the differential pressure. The control is effected in such a way that when there is a drop in the flow rate or an increase in the differential pressure, the rake gear is moved to a lower position, whereas when there is an increase in the flow rate or a drop in the differential pressure, it is moved to a higher position. In addition, the rotational speed of the rake gear can be increased or reduced at the same time as it is raised and lowered.

7 Claims, 3 Drawing Sheets

METHOD FOR OPERATING THE RAKE GEAR IN A LAUTER TUB FOR BEER PRODUCTION

BACKGROUND OF THE INVENTION

The present invention relates to a method for operating the rake gear in a lauter tub for beer production, characterized by controlled raising and lowering of the rake gear within the tub. By raising and lowering the rake gear, the knives thereof are rotated at different levels within the spent grains in the tub.

BRIEF DESCRIPTION OF THE PRIOR ART

Various methods for operating the rake gear in a lauter tub are known in the art, as evidenced by DD-PS No. 139,480. A primary drawback of the prior methods is that when the rake gear is rotating in its lower position, deep-cut raking occurs which results in a deterioration in quality of the wort since turbidity values rapidly increase. These high turbidity values decrease relatively slowly. Initiation of the deep-cut occurs automatically with the prior methodology, when a pre-set differential pressure is exceeded. If the pre-set differential pressure is exceeded, the rake gear is turned automatically, for a given period of time, to deep-cut. As a result, the lauter process is interrupted for the duration of each deep cut, which leads to an undesirable extension of the occupation time of the lauter tub.

Such an extension of the occupation time of the lauter tub as a result of deep cutting is referred to in the periodical "Brauwelt", Page 2341 at FIG. 4. This FIGURE is a graph which shows the sequence of a lauter process according to the then current technique plotted against time. In this lauter process, the raking takes place according to a pre-determined program at different height positions of the rake gear. As can be seen from the graph, every time the spent grains resistance, i.e. the differential pressure, becomes too great in the region of the lauter tub bottom, a deep cut is made. The curve illustrating the total lauter amount shows a break in the graph for the duration of each deep cut.

The present invention was developed in order to formulate a similar type of process to improve lautering with respect to four important criteria, namely, lauter time; brightness of the wort and, associated therewith, minimum tub content; yield; and occurrence of residual water. In addition, the inventive method was developed to avoid deep-cut raking and to produce minimal residual water while insuring optimum washing of the spent grains during lautering.

SUMMARY OF THE INVENTION

Accordingly, it is a primary object of the present invention to provide a method for operating a raking device in a lauter tub for beer production including the steps of continuously rotating the raking device within the tub, adjusting the height of the raking device within the tub in order to optimize the lautering process, and controlling the vertical displacement of the raking device in accordance with the operating parameters of the lautering tub.

In operation, the raking gear remains in a selected initial position in which the raking knives operate in the upper third of the spent grains layer. If any deterioration occurs during the course of the lautering process, then in accordance with the invention, the height of the rake gear is adjusted by vertically displacing the rake gear in order to optimize the lautering process.

According to a more particular object of the invention, vertical displacement of the raking device is controlled in accordance with the flow of lauter wort through the wort outflow of the lauter tub. Alternatively, vertical displacement of the raking device is controlled in accordance with the pressure differential within the lauter tub, that is, in accordance with the resistance of the spent grains. In this fashion, automatic control by flow rate or differential pressure of the raking device is obtained, preferably through use of a computer control device. With the inventive method, the spent grains cake is thoroughly washed out and yet the occurrence of residual water is minimized.

According to a more specific object of the invention, the rotational speed of the raking gear is controlled in accordance with the vertical displacement thereof. More particularly, the raking gear is rotated at an increased speed as the raking gear is lowered and at a reduced speed when the raking gear is raised.

According to another objection of the invention, when the optimum flow rate is achieved, the rotational speed of the raking gear is reduced in accordance with turbidity values thereof, until no further improvement of turbidity values can be achieved. When the maximum flow rate and minimum turbidity values are obtained, the rotational speed of the raking gear is reduced as far as possible without deteriorating the flow rate and turbidity values. After such a reduction in speed, the rate gear is then raised as far as possible without adversely affecting the flow rate and turbidity values.

BRIEF DESCRIPTION OF THE FIGURES

Other objects and advantages of the invention will become apparent from a study of the following specification when viewed in the light of the accompanying drawing in which.

DETAILED DESCRIPTION

The construction and method of operation of lauter tubs for the production of beer are well-known to those of ordinary skill in the art as are the principles and operation of the raking device (i.e. rake gear) within the lauter tub. Accordingly, a detailed description thereof need not be provided.

Figure 1:
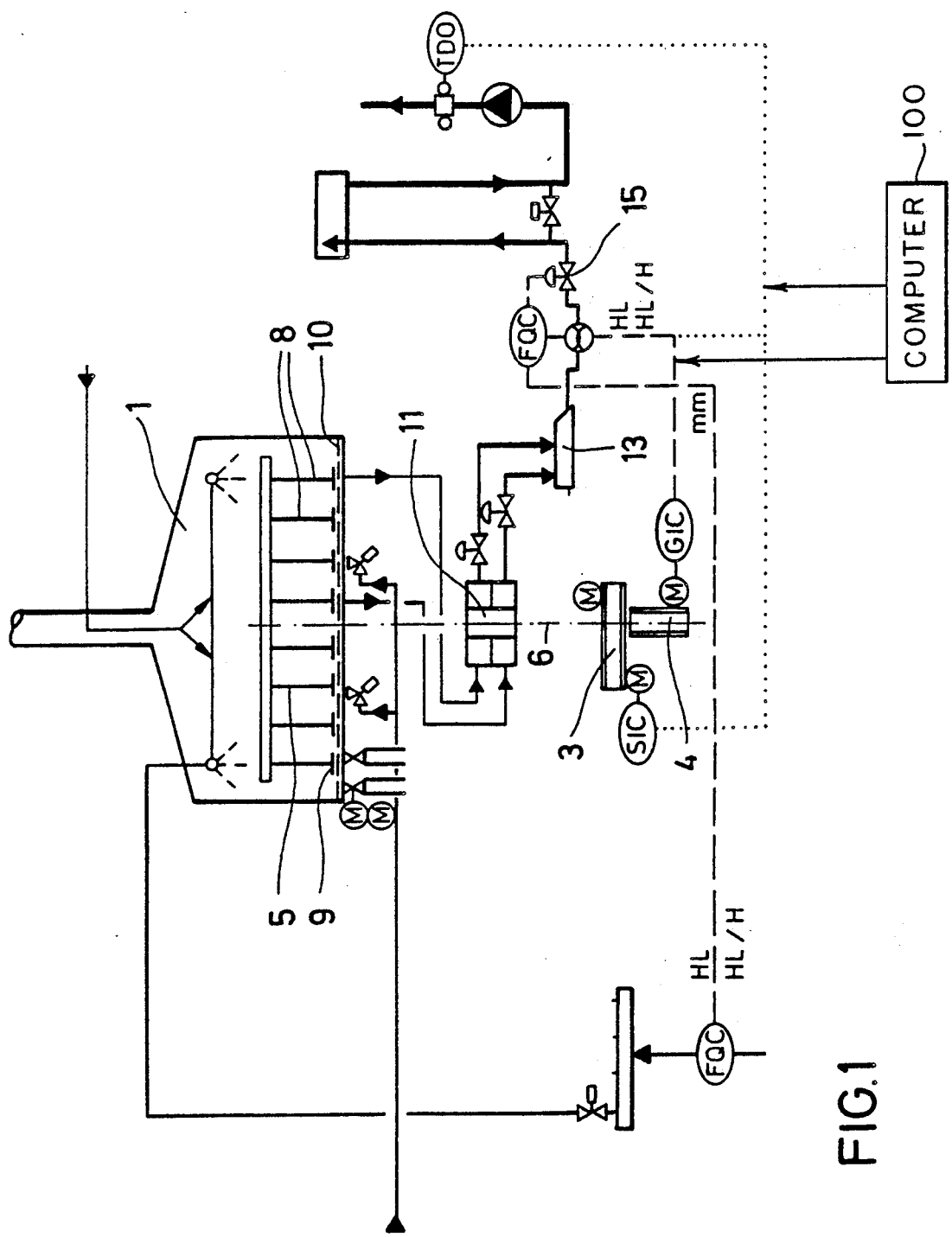
FIG. 1 is a flow diagram illustrating a first embodiment of the method for operating a raking device according to the invention.
Figure 2:
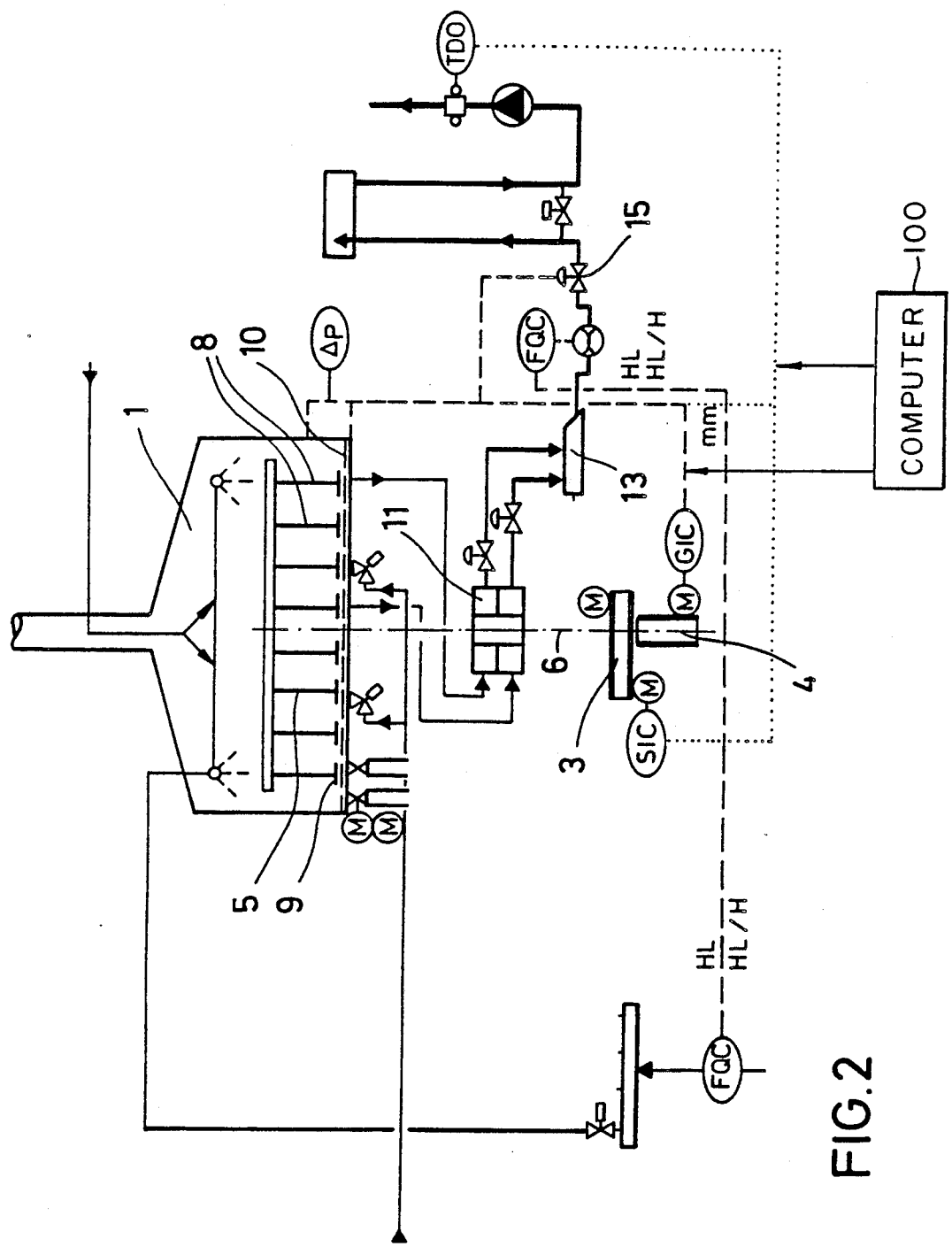
FIG. 2 is a flow diagram illustrating a second embodiment of the inventive processes.

In FIGS. 1 and 2, there is illustrated a lauter tub 1 which is fitted on a support (not shown) in order to provide space under the bottom of the lauter tub for installation of a drive system 3 and a raising and lowering system 4 for the rake gear 5 mounted on the lauter tub.

The rake gear includes a drive shaft 6 which is mounted for both rotation and axial displacement. At the upper end of the drive shaft 6 several vertical arms 8 are fixed about the circumference and at the same distance from one another. Each arm carries a row of rake knives 9 for the spent grains layer which is deposited during the lauter process as sediment on the false bottom 10 of the tub 1.

The drive shaft of the rake gear stands with its lower end section engaged with the drive system 3 and with the raising and lowering system 4.

When carrying out an operation in accordance with the invention, the sequence or progress of the lauter process is automatically monitored either continuously or at suitable intervals. Furthermore control commands are passed, depending on the result of the monitoring, to the drive systems of the raising and lowering device 4 in such a way that the rake gear is moved vertically into a different position which ensures optimum progress of the purification process, if the monitoring indicates that the actual values for flow rate and differential pressure are divergent from the pre-set values. In this manner, differences in the quality of the mash can be quickly compensated by changing the height position of the rake gear.

The two preferred starting values for the method according to the invention are the flow rate of the lauter wort from the lauter tub through the wort outflow into the underback (not shown) obtained by means of a flow meter FQC, and also, in accordance with a second embodiment of the invention, the resistance of the spent grains, i.e. the differential pressure in the area of the false bottom of the lauter tub.

The differential pressure $\Delta p$, as shown diagramatically in FIG. 2, is obtained from measurements made laterally in the spent grains layer and also underneath the false bottom.

As illustrated in FIG. 1 which illustrates control by flow rate, a first control circuit, represented by a broken line, runs from the flow meter FQC to the position indicator GIC of the raising and lowering device 4. With the aid of this first control circuit, the raising and lowering of the rake gear is automatically controlled, in accordance with the flow rate of the lauter wort, by means of the flow meter FQC. This automatic control is assisted by a computer 100.

As can be further seen in FIG. 1, there is a second control circuit, represented by a dotted line, stretching from the flow rate meter FQC to the rotation speed control SIC (frequency converter) of the drive mechanism of the rotary drive system for the rake gear. According to a preferred type of design of the invention, with the aid of this second control circuit, FQC-SIC, the circumferential or rotational speed of the rotating rake gear can also be automatically controlled in accordance with the flow rate and assisted by the computer 100.

There is also shown in FIG. 1 a third control circuit, represented by a dotted line, between the turbidity measuring unit TDO and the rotation speed control SIC of the drive system 3 for the shaft 6 of the rake gear 5. This control circuit TDO-SIC, in accordance with a preferred embodiment of the invention permits control of the circumferential speed of the rotating rake gear 5 in accordance with the measured turbidity values.

From the foregoing, it is evident that, as shown in FIG. 1, the raising and lowering of the rake gear is automatically controlled in accordance with the flow rate of the lauter wort through the wort outflow, and that, in addition, the circumferential speed of the rake gear can be controlled via the circuits FQC-SIC and TDO-SIC in accordance with the flow rate and turbidity.

Particularly advantageous results can be obtained if, while the rake gear is being lowered, its rotational speed is increased, and, while the rake gear is being raised its circumferential speed is reduced. When an optimum flow has been achieved, then depending on the turbidity measured at TDO, the rotational speed of the rake gear can be reduced until no further improvement of the turbidity values can be achieved. If a maximum flow and minimum turbidity have been reached, the rotational speed of the rake gear can be reduced in so far as this is possible without any deterioration in the flow rate and turbidity values.

In the embodiment shown in FIG. 2, the raising and lowering of the rake gear 5 is not dependent on the flow rate but rather on the measured differential pressure $\Delta p$, i.e. dependent on the measured spent grains resistance. A control circuit is provided between the point of measuring the differential pressure and the position indicator GIC of the drive for the raising and lowering device 4 of the rake gear. With the aid of this control circuit, $\Delta p$-GIC the raising and lowering of the rake gear is automatically controlled in accordance with the measured differential pressure $\Delta p$.

If the spent grains layer deposited on the false bottom 10 is to be loosened up, the drive system 3 is energized in order to rotate the drive shaft 6 and the arms 8 with their raking knives 9. For raising and lowering the rake gear 5, the raising and lowering device 4 must be activated to vertically displace the drive shaft 6 and the arms with their rake knives 9.

The lauter wort drawn off from the lauter tub 1 goes into a collecting bin 11 and from there into a central pipe 13 with which is connected an integrated flow indicator or meter FQC and a regulating valve 15. With the aid of the flow meter FQC, the total lauter quantity (h1) and the flow rate (h1/h) are measured. The turbidity (EBC) of the lauter wort is measured by means of a turbidity measuring device TDO fitted in the direction of flow after the control valve 15.

Frequency-controlled electric motors are provided as drive mechanisms M in both the drive system 3 of the rake gear and in the raising and lowering system 4 of the rake gear since these can be controlled over a wide speed range. A hydraulic power unit can also be fitted to give infinitely variable height adjustment.

FIG. 1 illustrates the automatic control system for operating the rake gear in accordance with the flow rate, while FIG. 2 illustrates the automatic control for operating the rake gear in accordance with the differential pressure, i.e. the resistance of the spent grains within the lauter tub.

A control circuit $\Delta p$-SIC represented by a dashed line, is also provided in the embodiment of FIG. 2 for controlling the rotational speed of the rake gear 6 in accordance with differential pressure. Preferably, the rotational speed of the rake gear is increased as the rake gear is lowered and decreased when the rake gear is raised.

A further control circuit TDO-SIC is provided for reducing the rotational speed of the rake gear after an optimum flow rate or differential pressure based upon turbidity has been reached until no further improvement in turbidity can be obtained.

By using the control circuits affecting the rotational speed of the rake gear, it is possible to insure that when optimum values for flow rate or differential pressure and turbidity have been achieved, the circumferential speed of the rake gear can be reduced to a minimum which will have no adverse effect. At the same time, with the aid of the control circuits affecting the raising and lowering device 4 of the rake gear, the latter can be raised or lowered to an optimum value.

The frequency-controlled drive makes it possible to have an optimum circumferential speed, which suits the quality of the grist and malt used in beer production. The circumferential speed lies within the range of 0.8 to 2.5 m/min.

The rake gear is not forced to move up and down as in the prior continuous lautering processes, but rather moves up and down under computer control with infinitely variable motion depending on the differential pressure or on the flow rate. As the flow rate drops, the rake gear immediately reacts and pauses in the last-reached position during the "collection" of the flow and then returns to its previous starting position when the nominal value has been re-attained due to the constant comparison between nominal and actual values of the flow rate and differential pressure.

This method of operation allows the rake gear to be controlled for continuous vertical displacement without clouding the lauter wort and spoiling the filter sheet. At the same time, the spent grains layer is kept so loose that a deep cut, and the drawbacks thereof, such as clouding etc., is not needed. If however, for example, the malt quality changes and a forced raking becomes absolutely necessary, then the rake gear will move, according to the predetermined criteria, into its lowest position and raking will take place in the conventional manner. This possibility, however, is the exception in extraordinary operating conditions, such as increased viscosity in case of poor or insufficient saccharification.

When executing the method according to the invention on the basis of experienced values, a nominal value is pre-set for the flow and/or differential pressure. If, in the course of the operation, divergence of the actual values from the nominal values occurs, then the rake gear is immediately automatically displaced to a higher or lower position until the actual value returns once more to the nominal value.

As long as the actual values achieved are the same as the nominal values, the raking device remains in the neutral position. Thus, the operation according to the invention proceeds in such a way that great divergences of the actual values from the nominal value result in great changes in the height of the rake gear, while small divergences result in correspondingly smaller changes in the vertical position.

As mentioned above, a particularly advantageous formulation of the operation results if, during the lowering of the rake gear, the circumferential speed of the rake gear is increased. Conversely, an advantageous formulation results when the rake gear's circumferential speed adjusts to a lower speed when it is being raised.

If the differential pressure is used as the reference value, this means that when the pressures obtained are equal (difference =0), optimum flow rate prevails. If, however, the pressure difference is greater than a pre-determined value, then the flow is disturbed which results in a corresponding automatic activation of the height position of the rake gear, in accordance with the kind of action illustrated in FIG. 2.

Control of the height position of the raking device is not fixed to a definite flow value, a definite differential pressure, or to a definite height position of the rake gear. Rather, in the case of flow reduction, the rake gear moves so far in the direction of the lauter tub bottom, until the desired differential pressure is reached. This results from a constant comparison between nominal and actual values of flow rate and/or differential pressure. Once the nominal value is regained, the rake gear returns by automatic control to a higher position, such as for example its initial position, in so far as the flow rate values or differential pressure values are not made worse.

If an optimum flow has been attained, then the normal rotational speed of the rake gear is automatically further reduced in accordance with the measured turbidity level (by degrees), until the turbidity values cannot be further improved and the circumferential speed has not dropped below its pre-set minimum value.

Consequently, the control of the height position of the rake gear follows the principle of always positioning the rake gear as high as possible without adversely affecting the flow rate or the differential pressure. This principle is advantageous with regard to the brightness of the wort for which the solids content is so much lower, the less deeply the rake gear's knives cut into the spent grains layer.

From the foregoing it follows that when there is a fall in the flow rate, the height position of the rake gear is controlled in such a way that during the so-called "collection" of the flow, the rake gear stays in its last-adopted position in order to return, after a pre-determined period of time, to its starting position.

It should be emphasized that in the operation according to the invention, the nominal value for the flow rate and/or for the differential pressure can be varied to be time-dependent, preferably continuously and in conjunction with the rest of the run-off process. If, for example, run-off is continuous, then normally the first wort—without the addition of water—is taken off until the spent grains run dry, then the sparging water is added continuously, depending on the run-off wort. The nominal value for the flow rate and/or the differential pressure can have a different value at the beginning of run-off of the first wort from that at the end. Furthermore, during sparging, another nominal value can be selected for the flow rate and/or the differential pressure than during the run-off of the first wort. The nominal values for the various operational stages are set on the basis of experience.

Since, as a result of the controlled loosening up of the spent grains layer, there is no need for any deep-cutting of the spent grains layer, no excessive consolidation of the spent grains layer occurs, and this shortens the required lauter time.

Due to the shorter lauter time, together with the omission of interference with the filter sheet, the amount of residual water during lautering is reduced.

The vertical displacement of the rake gear is limited within a definite range. The lower limit is set just so far above the tub false bottom that the filter sheet resting there is not reached, while the upper limit of the height movement is selected so that the rake knives operate just within the spent grains layer. Consequently, even in the lowest operating position of the rake gear, the rake knives are always within the spent grains layer.

From the foregoing description of the inventive method, it is evident that the height position of the rake gear rotating in a lauter tub is automatically controlled in accordance with the flow rate or with the differential pressure. This control is effected in such a way that, with a drop in the flow rate or with an increase in the differential pressure, the rake gear is moved to a lower position whereas on the other hand, with an increase in the flow rate or a decrease in the differential pressure, it is moved to a higher position. The direction and extent of the vertical displacement of the rake gear are automatically controlled by the computer 100 to achieve an optimum level with respect of flow rate and differential pressure.

Figure 3:
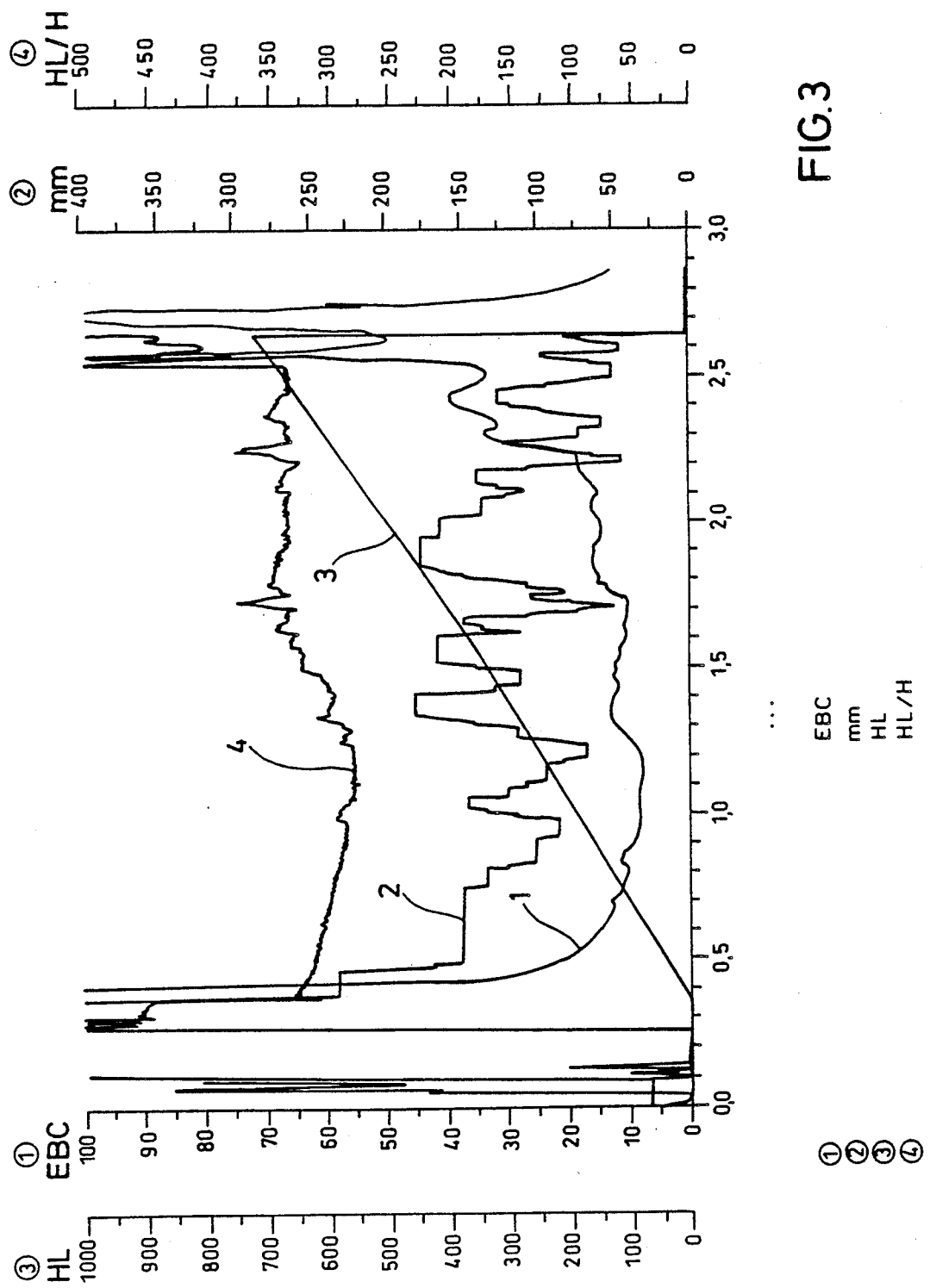
FIG. 3 illustrates lauter curves of a brew house operating in accordance with the inventive process.

Referring now to FIG. 3, there is shown a graph in which the following four parameters are plotted against time:
1. the turbidity;
2. the position of the rake gear;
3. the total lauter quantity; and
4. the measured flow rate.

In the graph of FIG. 3, curve 1 indicates the turbidity (EBC) and curve 2 the position of the rake gear (mm). Curve 3 indicates the total lauter quantity (hl), and curve 4 indicates the flow rate (hl/h). On the left of the graph, Scale 1 reproduces the EBC values for the turbidity, and Scale 3 the total lauter quantity (hl). On the right of the graph, Scale 2 reproduces the height position of the rake gear (mm) and Scale 4 the flow rate (hl/h).

From FIG. 3 it is easy to recognize how the rake gear, with respect of its height position (curve 2), follows changes in the flow rate values (curve 4). It is, however, particularly worthy of note that curve 3, representing the total run-off, has practically no breaks from which it follows that there have been no interruptions during the lauter process. In particular even at times when the rake gear occupies particularly deep operating positions, no interruption of the lauter process occurs.

What is claimed is:

1. A method for operating a raking device in a lauter tub having a wort outflow and containing a lauter wort from which beer is produced from a lautering process within the tub, comprising the steps of
    (a) continuously rotating the raking device within the tub; and
    (b) continuously vertically displacing the raking device within the tub in accordance with the flow of the lauter wort through the wort outflow of the lauter tub and in accordance with the pressure differential within the tub, thereby to optimize the lautering process.

2. A method as defined in claim 1, wherein vertical displacement of the raking device is controlled by a computer.

3. A method as defined in claim 1, and further comprising the step of controlling the rotational speed of the raking device in accordance with the vertical displacement thereof.

4. A method as defined in claim 3, wherein the rotational speed of the raking device is increased when the raking device is lowered and decreased when the raking device is raised.

5. A method as defined in claim 3, and further comprising the steps of measuring the turbidity of the wort from the lauter tub and reducing the rotational speed of the raking device when maximum wort flow is obtained until no additional improvement in measured turbidity can be obtained.

6. A method as defined in claim 5 wherein when maximum flow and minimum turbidity of the wort are obtained, the rotational speed of the raking device is reduced as far as possible without disturbing the maximum flow and minimum turbidity values.

7. A method as defined in claim 6, wherein when the rotational speed of the raking device is reduced as far as possible, the raking device is raised as far as possible.

* * * * *

UNITED STATES PATENT AND TRADEMARK OFFICE
CERTIFICATE OF CORRECTION

PATENT NO. : 4,990,346

DATED : February 5, 1991

INVENTOR(S) : STIPPLER, Kurt et al

It is certified that error appears in the above-identified patent and that said Letters Patent is hereby corrected as shown below:

ON TITLE PAGE: Item [19] and [75],

Correct the spelling of the first-named inventor to read:

-- Kurt Stippler --.

Signed and Sealed this

Twenty-sixth Day of May, 1992

Attest:

DOUGLAS B. COMER

*Attesting Officer*  *Acting Commissioner of Patents and Trademarks*